United States Patent
Suzuki

(10) Patent No.: US 6,295,077 B1
(45) Date of Patent: Sep. 25, 2001

(54) IMAGE FORMING APPARATUS

(75) Inventor: Kazuyoshi Suzuki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/917,862

(22) Filed: Aug. 27, 1997

(30) Foreign Application Priority Data

Sep. 6, 1996 (JP) .................................................. 8-236389

(51) Int. Cl.⁷ ...................................................... B41J 2/47
(52) U.S. Cl. ........................................... 347/237; 347/247
(58) Field of Search .................................... 347/237, 116, 347/247; 358/296, 300, 288, 267, 268

(56) References Cited

U.S. PATENT DOCUMENTS

| | | | |
|---|---|---|---|
| 3,707,725 | * 12/1972 | Dellhelm | 444/134 |
| 4,521,813 | * 6/1985 | Yoshida et al. | 358/296 |
| 4,807,047 | * 2/1989 | Sato et al. | 358/300 |
| 5,206,501 | * 4/1993 | Sakakibara et al. | 358/461 |
| 5,579,092 | * 11/1996 | Isobe et al. | 347/116 |

* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

An image forming apparatus wherein data which enters in parallel a plurality of pixels at a time is converted to a serial image data string. This serial image data string is shifted by a predetermined number of pixels, the shifted serial image data string is output in parallel a plurality of pixels at a time, and an image is formed based upon the image data output in parallel a plurality of pixels at a time.

23 Claims, 7 Drawing Sheets

IMAGE FORMING APPARATUS

BACKGROUND OF THE INVENTION

1. Field of the Invention

This invention relates to an image forming apparatus and, more particularly, to an apparatus for forming an image by processing image data in units of a plurality of samples.

2. Description of the Related Art

Apparatuses employing electrophotography have become increasingly popular as apparatuses for forming images. Electrophotography involves forming an image by scanning a photosensitive element with laser light or light from an LED that conforms to the value of image data. In an apparatus of this kind, the transmission of image data to a laser driver which drives a laser generally is performed in units of single pixels. However, advancements in image processing techniques have been accompanied by higher image processing speed and higher resolution, and it is desired that the speed at which image data is transferred to the laser driver be raised also in an image forming apparatus of the type which relies upon electrophotography.

In order to accommodate this demand for higher transfer speed, data consisting of a plurality of pixels (samples) is packed and then sent to the laser driver, thus making possible a substantial increase in transfer speed. However, when data of a plurality of pixels is transferred to the laser driver in the form of a pack in this manner, fine adjustment of scanning position in the main scan direction of the photosensitive element can only be performed in data pack units.

More specifically, in an image forming apparatus, particularly a color image forming apparatus having four photosensitive drums, in which colors are formed on the plurality of photosensitive drums in respective ones of the colors used and the color images are transferred to a single sheet of recording paper so as to overlap one another and form the final full-color image, the fact that adjustment cannot be made in units of single pixels means that it is not possible to adjust for a subtle positional deviation between colors in the formed image, where the offset is produced physically due to positional deviation in the positions at which the photosensitive drums or lasers for the various colors are disposed. As a consequence, a problem which arises is the formation of a poor quality image in which the positions of the color images that constitute the final full-color image do not coincide.

SUMMARY OF THE INVENTION

Accordingly, an object of the present invention is to solve the problem mentioned above.

Another object of the present invention is to make it possible to adjust the position of an image highly precisely when an image is formed by processing image data in plural-pixel units.

Another object of the present invention is to make it possible to correct the positional deviation between color images in a highly precise manner when an image is obtained by transferring images of a plurality of colors to a common recording medium.

According to the present invention, the foregoing objects are attained by providing, as one embodiment of the invention, an image forming apparatus comprising first converting means for converting means for converting image data, which enters in parallel a plurality of pixels at a time, to a serial image data string, shifting means for shifting, by a predetermined number of pixels, the serial image data string output by the first converting means, wherein the predetermined number of pixels equates to an amount of adjustment for correction of an image position, second converting means for converting the serial image data string, which has been output by the shifting means, to parallel image data a plurality of pixels at a time, and image forming means for forming an image based upon the image data output by the second converting means in parallel a plurality of pixels at a time.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

Figure 1:
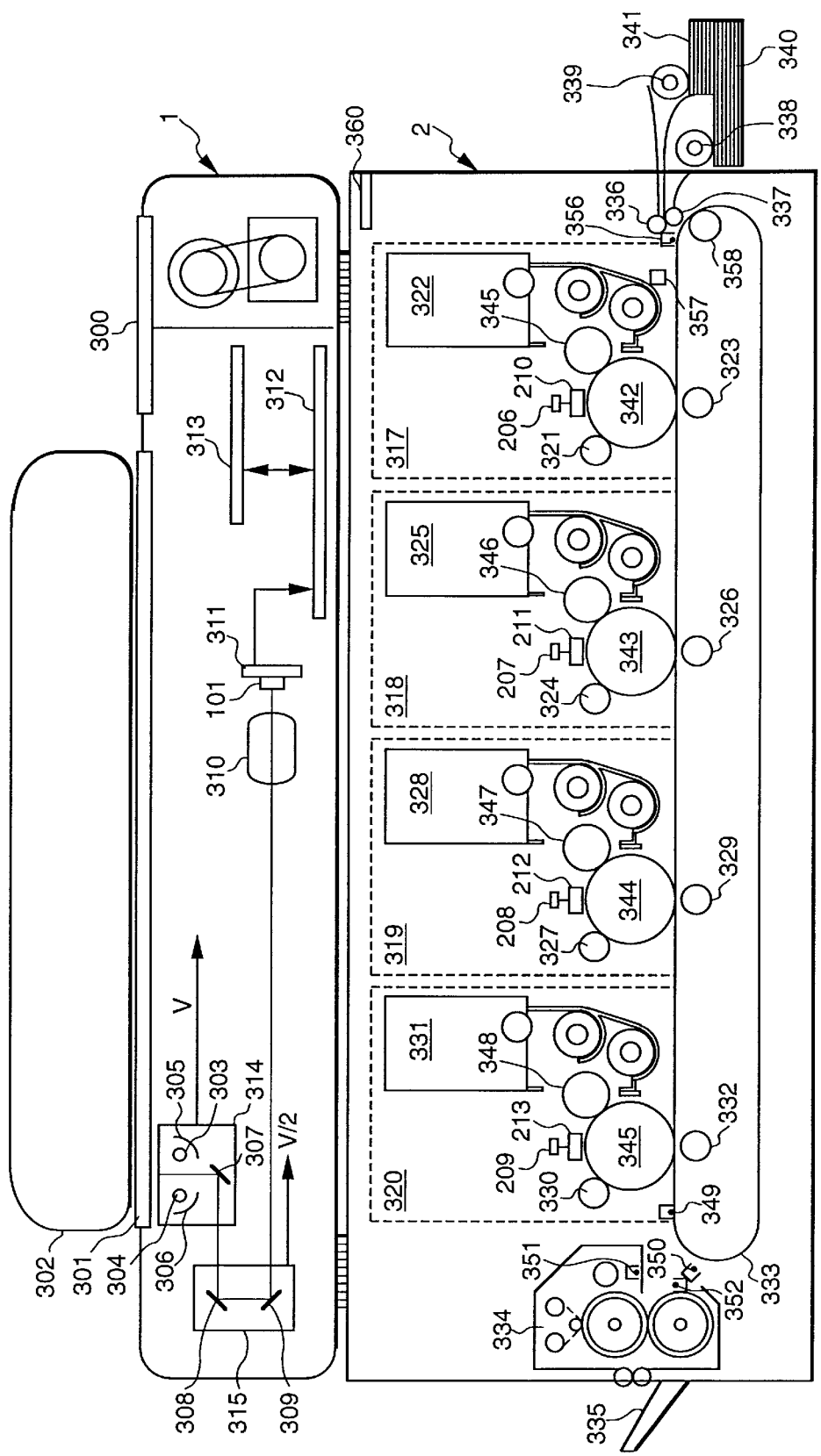
FIG. 1 is a diagram showing the construction of a digital copier embodying the present invention.

FIG. 1 is a side sectional view illustrating a color copier to which an embodiment of the present invention is applied. As shown in FIG. 1, the color copier includes a reader 1 for reading a document image, and a printer 2 for forming the document image, which has been read by the reader 1, on recording paper to produce a printout. The various components and their operations will be described below.

Construction of Reader 1

The details of construction of the reader 1, which reads in the document image and produces a signal for forming an image, will now be described.

As shown in FIG. 1, the reader 1 includes a CCD 101, a board on which the CCD 101 has been mounted, an image processing unit 312, a glass platen 301, a document feeder (DF) 302 (though an arrangement may be adopted in which a platen pressure plate, not shown, is attached instead of the document feeder), light sources (halogen or fluorescent lamps) 303, 304 for illuminating a document placed on the platen 301, reflection umbrellas 305, 306 for collecting the light from the light sources 303, 304 on the document, mirrors 307~309, a lens for focusing light reflected from the document or projected light on the CCD 101, a carriage 314 which accommodates the halogen lamps 303, 304, reflection umbrellas 305, 306 and mirror 307, a carriage 315 for accommodating the mirrors 308, 309, and an external interface (I/F) 313 for interfacing an external device, such as an external personal computer (PC) or the like. The carriage 314 and the carriage 315 are moved mechanically in the direction (sub-scan direction) perpendicular to the electrical scanning direction (main-scan direction) of the CCD 101 at velocities V and V/2, respectively, thereby scanning the entire surface of the document.

Construction of Image Processing Unit 312

Figure 2:
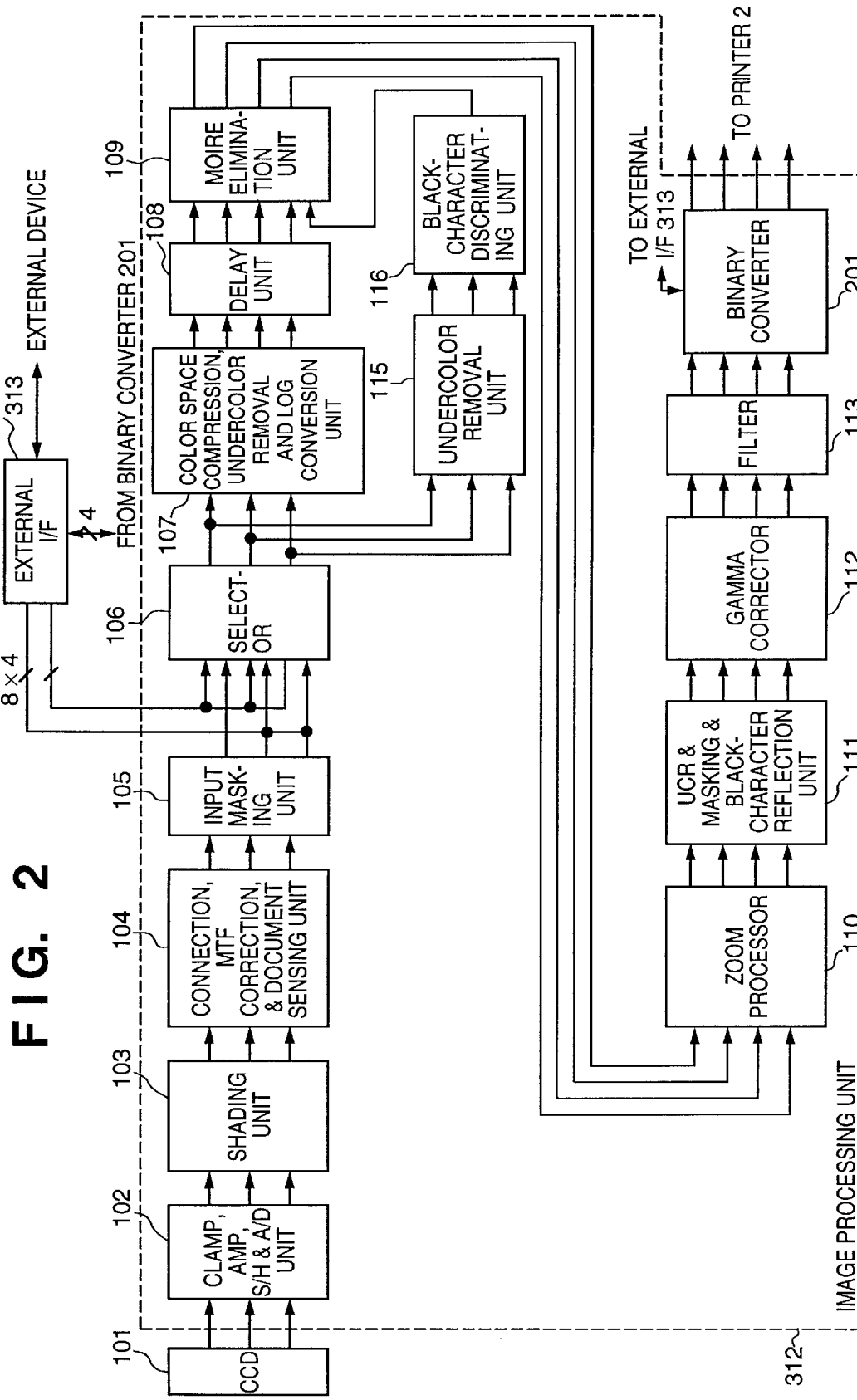
FIG. 2 is a diagram showing the construction of an image processing unit in FIG. 1.

FIG. 2 is a block diagram illustrating the details of the construction of the image processing unit 312. The operation of the image processing unit 312 will be described below.

First, the document on the platen 301 reflects the light emitted by the light sources 303, 304, and the reflected light is introduced to the CCD 101 by which the light is converted to an electric signal (analog image signal). The CCD 101 in this embodiment is a three-line CCD in which R, G and B filters are arranged for respective ones of the CCDS. The CCD 101 may be of the type in which the R, G, B color filters are placed in line on a one-line CCD in the order R, G, B, or in which the filters are placed on the chip or disposed separately of the CCD.

The analog image signals enter a clamping, amplifying, sampling-and-holding A/D unit 102 which, after sampling and holding the analog image signals, clamps the dark levels of the analog image signals to a reference potential, applies a prescribed amount of amplification and then converts the resulting signals to 8-bit digital signals for respective ones of the R, G, B pixels (samples). (The sampling and holding operation may be performed after amplification rather than before.)

Next, R, G, B digital signals are subjected to a shading correction and black correction in a shading unit 103, after which signals are sent to a connecting, MTF-correction and document sensing unit 104, which executes connecting processing, MTF correction processing and document sensing processing. Since the line reading positions of the three-line CCD 101 differ from each other, the connecting processing involves adjusting the amount of delay per line in dependence upon reading speed and correcting signal timing in such a manner that the reading positions of the three lines will be the same. Further, since the MTF of reading varies depending upon the reading speed and zoom ratio, the MTF processing is required to correct for this variation. The document sensing processing is processing for recognizing document size by scanning the document on the platen 301.

The digital signals for which the reading position timing has been corrected enter an input masking unit 105. Here the spectral characteristics of the CCD 101, light sources 303, 304 and reflection umbrellas 305, 306 are corrected, after which the corrected signals enter a selector 106. The latter is capable of switching between these signals and signals that enter from the external interface 313. The signals output from the enter a unit 107, which performs color space compression, undercolor removal and logarithmic conversion, and an undercolor removal unit 115.

The signals that enter the undercolor removal unit 115 are subjected to undercolor removal, after which the signals enter a black-character discriminating unit 116, which determines whether an image in the document is a black character and generates a black-character signal from the image signal. The unit 107 determines whether a read image signal lies within a color range capable of being reproduced by the printer 2 and passes the signal without processing if the signal lies with the reproducible range. If the signal does not fall within this range, the unit 107 performs a correction based upon color space compression in such a manner that the image signal will fall within the color range capable of being reproduced by the printer 2. After applying undercolor removal processing, the unit 107 converts the RGB signals to CMY signals by a logarithmic conversion. The output signals of the unit 107 have their timing adjusted by a delay unit 108 to correct for any deviation with respect to the timing of the signal produced by the black-character discriminating unit 116.

The two types of signals output by the units 107 and 116 undergo moiré elimination in a moiré elimination unit 109. The resulting signals are zoomed in the main-scan direction by a zoom processor 110. Zooming the sub-scan direction in this embodiment is achieved by changing the traveling speed of the carriage 314.

On the basis of the C, M, Y signals zoomed by the zoom processor 110, a UCR, masking, black-character reflecting unit 111 produces C, M, Y, K signals by UCR processing and corrects these signals by masking processing to signals conforming to the output characteristic of the printer. Then, by black-character reflection processing, the unit 111 feeds back the discrimination signal, which has been generated by the black-character discriminating unit 116, to the C, M, Y, K signals.

The image signals processed by the unit 111 enter a gamma correction unit 112, where density is adjusted by a gamma correction. The adjusted signals are then subjected to smoothing or edge processing by a filter unit 113 before being applied to a binary converter 201. The latter converts the multivalued signals, in each of which one pixel is represented by eight bits, to binary signals of one bit per pixel. The binary conversion method may be the dither method, the error diffusion method or an improvement on the error diffusion method. The bi-level data obtained by the conversion is packed for every eight bits, i.e. every eight pixels, of each color and is sent to the printer 2 at a frequency which is one-eighth that of the image clock (at a period which is eight times that of the image clock) serving as the operating clock of the image processor 312. The image clock and the clock for the transfer from the binary converter 201 to the printer 2 are generated by a clock generating circuit (not shown), and the frequency of the image clock is the sampling frequency of the sample-and-hold circuit 102.

In this embodiment it is possible to process an image signal that has entered from an external unit via the external interface 313 and it is also possible to output the bi-level image signal, which has been produced by the binary converter 201, to the external unit via the external interface 313.

Construction of Printer 2

The details of construction of the printer 2, which forms a full-color image based upon the document image signal read in by the reader 1.

As shown in FIG. 1, the printer 2 includes an image positioning section 360, which is a characterizing feature of the present invention. The details of this section will be described in detail later. The printer 2 further includes a yellow (Y) image forming unit 317, a magenta (M) image forming unit 318, a cyan (C) image forming unit 319 and a black (K) image forming unit 320. Since these image forming units for the respective colors are identical in construction, only the Y-image forming unit 317 will be described in detail and a description of the other image forming units is omitted.

The Y-image forming unit 317 has a photosensitive drum 242 on the surface of which a latent image is formed by irradiating light from an LED array 210 driven by an LED driver 206, a primary corona discharge device 321 for charging the surface of the photosensitive drum 342 to a predetermined potential so as to prepare for latent image formation, and a developing device 322 for forming a toner image by developing the latent image formed on the photosensitive drum 342. The developing device 322 includes a sleeve 345 for developing the image by application of an image developing bias. The Y-image forming unit 317 further has a transfer corona discharge device 323 which produces an electrical discharge from the back surface of a transfer belt 333 so that the toner image that has been formed on the photosensitive drum 342 is transferred to a recording paper of the like on the transfer drum 333. Since the transfer efficiency in this embodiment is good, a cleaner for removing residual toner from the photosensitive drum is not particularly provided. However, it goes without saying that the cleaner can be installed without problem.

The procedure through which an image is formed on (transferred to) the recording paper will be described next.

Recording paper stored in cassettes 340, 341 is supplied to the transfer belt 333 one sheet at a time by pick-up rollers 339, 338 and paper feed rollers 336, 337. The sheet of recording paper supplied is charged by an attracting corona discharge device 356. A transfer belt roller 358 drives the transfer belt 333 and cooperates with the attracting corona discharge device 356 to charge the recording paper so that the recording paper is attracted to the transfer belt 333. A paper leading-edge sensor 357 senses the leading edge of the recording paper on the transfer belt 333. The leading-edge sensor 357 produces an output signal which is sent from the printer 2 to the reader 1 and is used as a sub-scan synchronizing signal when an image signal is sent from the reader 1 to the printer 2.

The sheet of recording paper thus supplied and charged is conveyed by the transfer belt 333 so that toner images are formed on its surface in the order of the colors Y, M, C, K at the image forming units 317~320.

The sheet of recording paper that has traversed the K-image forming unit 320 has its charge removed by a de-electrifying corona discharge device 349 in order to facilitate separation from the transfer belt 333. A corona discharge device 350 prevents disturbance of the image resulting from peel-off discharge when the recording paper is separated from the transfer belt 333. The recording paper that has been separated from the transfer belt 333 is charged by prefixing corona discharge devices 351, 352 in order to prevent disturbance of the image by reinforcing the toner attracting force. The toner image is thermally fixed by a fixing device 334. The recording paper is then ejected into an exit tray 335.

Image Positioning Processing

Figure 3:
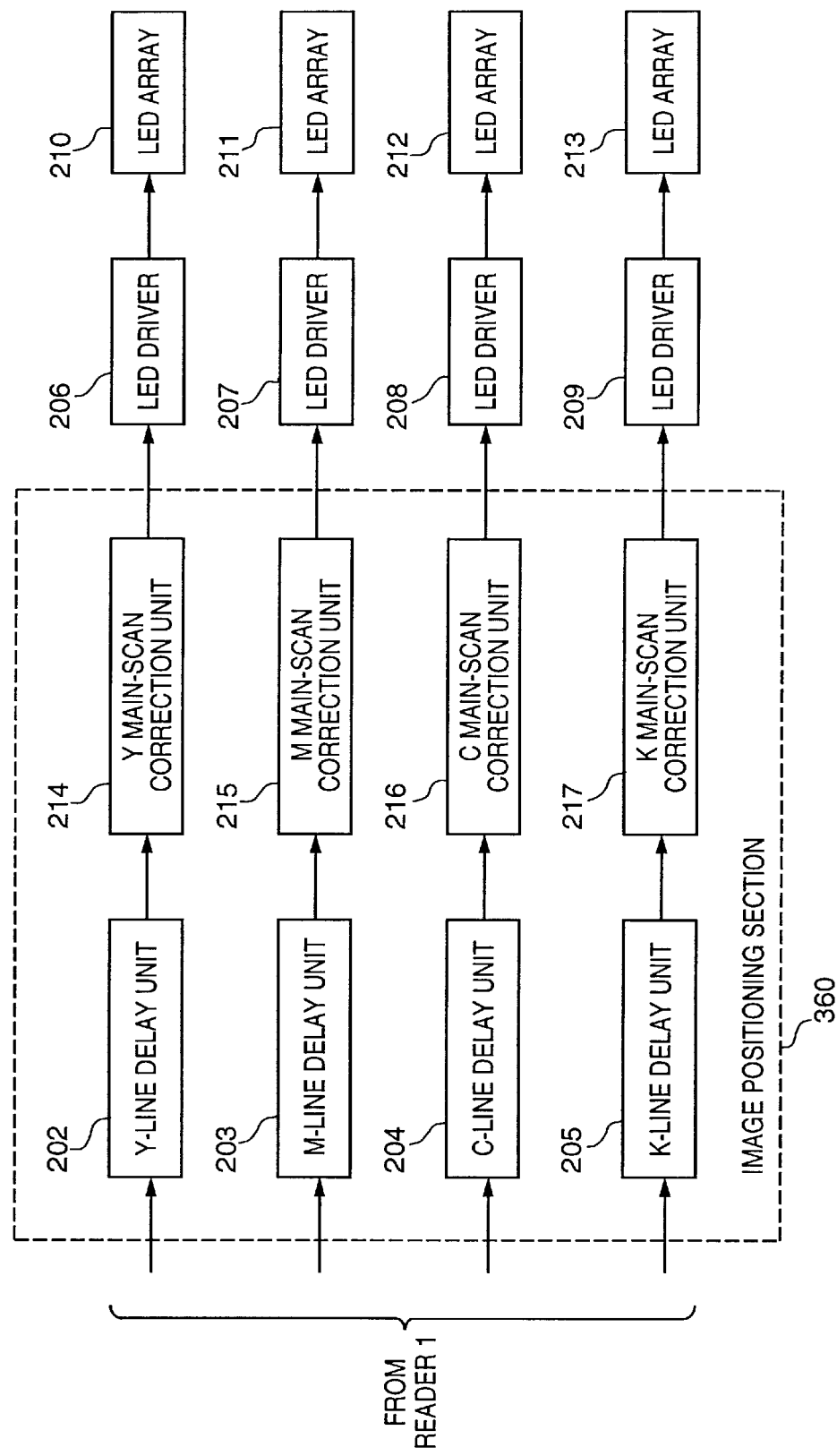
FIG. 3 is a diagram showing the construction of an image position unit in FIG. 1.

Image positioning processing, which is a characterizing feature of this embodiment, will be described in detail. First, the flow of image data in the printer 2 will be described with reference to FIG. 3.

The bi-level Y, M, C, K image signals produced in the image processor 312 of FIG. 2 and packed eight bits (pixels) at a time are sent to the image positioning section 360, in which the image signals of the respective colors are stored in delay units 202~205 each comprising memory capable of storing plural lines of the image signals. On the basis of the leading-edge detection signal from the paper leading-edge sensor 357, the timing at which the image signals are read out line delay (memory) units 202~205 of each color is controlled and the differences in the distances between the paper leading-edge sensor 357 and each of the image forming units 317~320 are adjusted. As a result, positioning in the sub-scan direction is performed with regard to the color images for each of the colors Y, M, C and K.

The LED arrays for the respective colors are not necessarily in agreement in terms of their main-scan positions owing to a problem in the mounting precision of each LED constituting the LED arrays 210~213. Accordingly, it is required that the item of image data for each color be subjected to a correction in the direction (main-scan direction) in which the LEDs are arrayed to thereby perform positioning in the main-scan direction. This correction is carried out in main-scan correction units 214~217.

Figure 4:
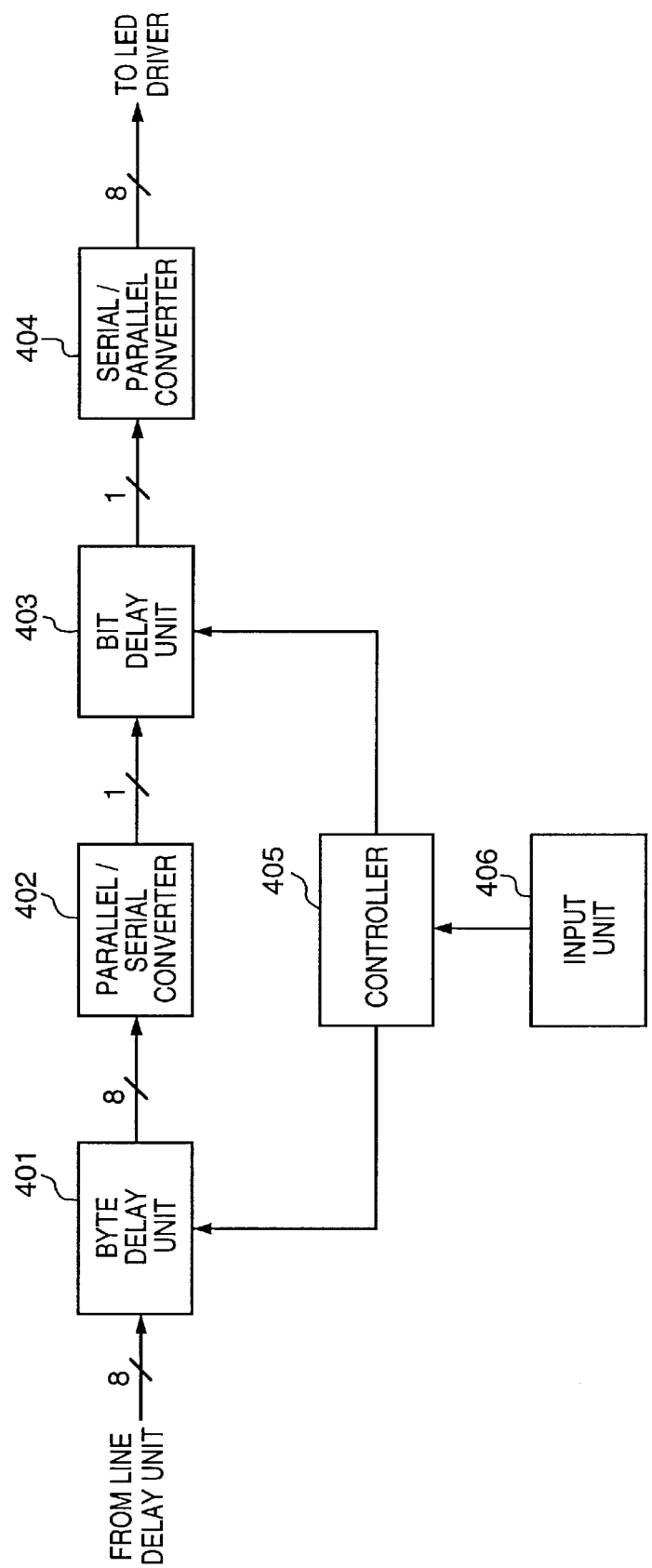
FIG. 4 is a diagram showing the construction a main-scan unit in FIG. 1.

The details of the construction of the main-scan correction unit 214 are shown in FIG. 4 and will be described with reference to FIG. 4. The main-scan correction units 215~217 have the same construction as that of the main-scan correction unit 214.

The 8-bit (1-byte) image data sent from the line delay unit 202 and packed eight pixels at a time is sent to a byte delay unit 401, which comprises a register capable of storing a plurality of bytes of image data. The byte delay unit 401 delays the image data by a quotient which is the result of dividing the number of pixels desired to be delayed for a fine adjustment by eight. That is, the byte delay unit 401 delays the image data by a number of bytes corresponding to the integer portion of the quotient.

For example, if a shift of 28 pixels is desired, then we have 28÷8=3 (with a remainder of 4). Therefore a delay of three bytes is applied to the image data. The 8-bit parallel data is converted to serial data, i.e. the byte data is converted to a string of bit data, in a parallel/serial converter 402. The serial data is applied to a bit delay unit 403, which comprises a register capable of storing several bits (seven bits in this embodiment) of image data. The bit delay unit 403 delays the input serial data by a number of bits corresponding to the remainder obtained when the number of pixels desired to be delayed is divided by eight. For example, if the number of pixels desired to be shifted is 28, then the bit delay unit 403 applies a delay of four bits. The bit-delayed bit data string is converted to parallel data again, namely to byte data, in a serial/parallel converter 404, whence the parallel data is sent to the LED driver 206.

On the basis of an adjustment quantity entered by the user from an input unit 403 described below, the amount of delay produced by the byte delay unit 401 and bit delay unit 403 is adjusted by a controller 405 which controls the write and readout timing of each register.

More specifically, in this embodiment, a pattern image for discriminating the amount of positional deviation between the color images is formed on the recording paper and a user or serviceman observes this image and measures the amount of shift of each color image with respect to a predetermined reference position. The user or serviceman then enters, from the input unit 406, a value that conforms to the amount of positional deviation of each color image with respect to the predetermined reference position. The controller 405 decides and changes the amount of delay in each delay unit in conformity with the entered value.

Figure 5:
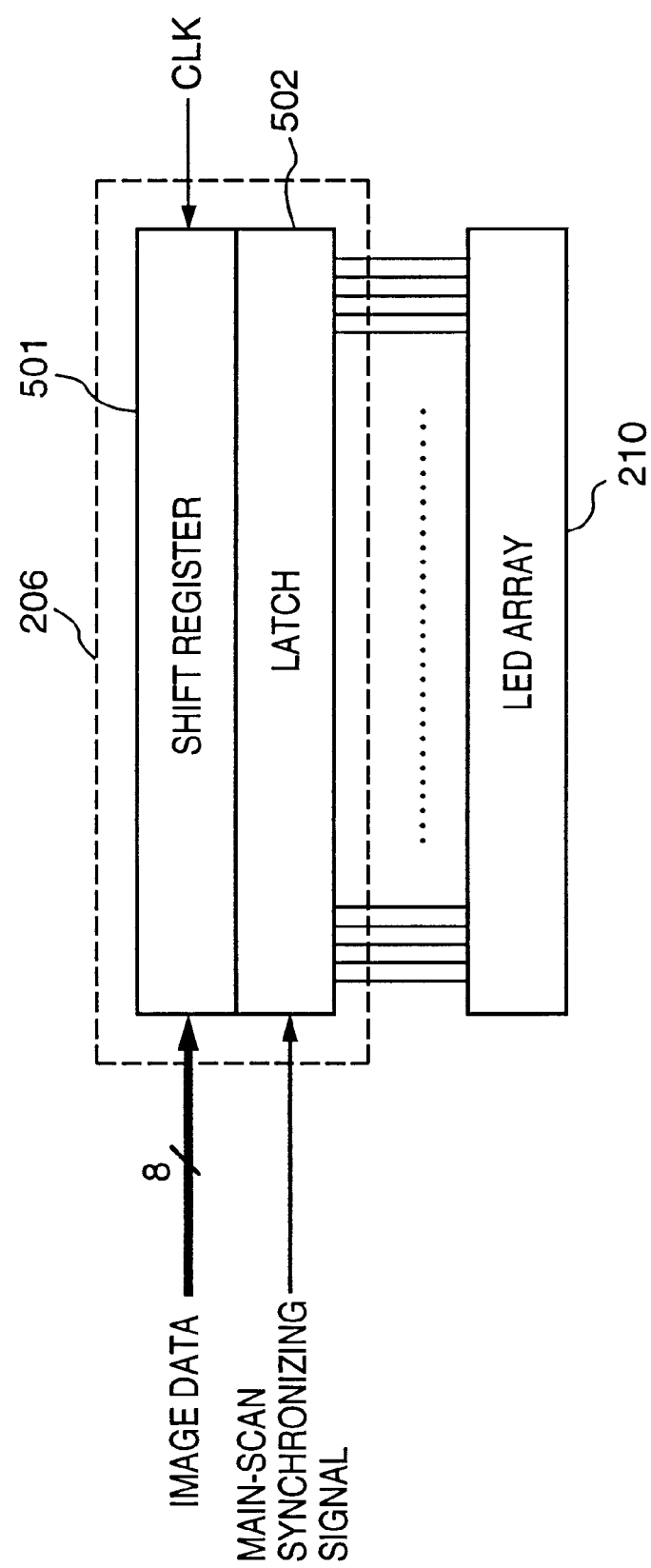
FIG. 5 is a diagram showing the construction of a driver in FIG. 1.

FIG. 5 is a diagram showing the construction of the LED driver 206. The LED drivers 207~209 have a construction identical with that of the LED driver 206.

The image data sent eight bits at a time from the main-scan correction unit 214 in the manner described above is sent to a shift register 501. The latter successively shifts the entered image data in accordance with the image clock sent from the above-mentioned clock generating circuit and accumulates one line of image data.

The image data shifted and accumulated is latched in a latch 502 at the timing at which the main-scan synchronizing signal enters. The LED array 210 is turned on or off based upon data (1,0) from the latch 502 corresponding to each LED element.

In accordance with this embodiment as described above, even an image processing apparatus in which image data is transferred to an LED driver in units of a plurality of pixels (parallel data) can be so adapted that the parallel data is converted to serial data, the serial data is then bit-shifted and the shifted data is converted back to parallel data, thereby making it possible to finely adjust the data delay which is based upon pixel units, namely the pixel position in the main-scan direction. Accordingly, even if a plurality of photosensitive drums are used, adjustment of pixel position in the main-scan direction can be performed for each color. As a result, it is possible to form a high-quality image which exhibits little positional deviation.

In the embodiment set forth above, an example is described in which image data in byte units can be delayed in bit units (pixel units) in the main-scan correction units 214~217 of the image positioning section 360 by performing a parallel/serial conversion, bit delay and serial/parallel conversion by the arrangement illustrated in FIG. 4.

Figure 6:
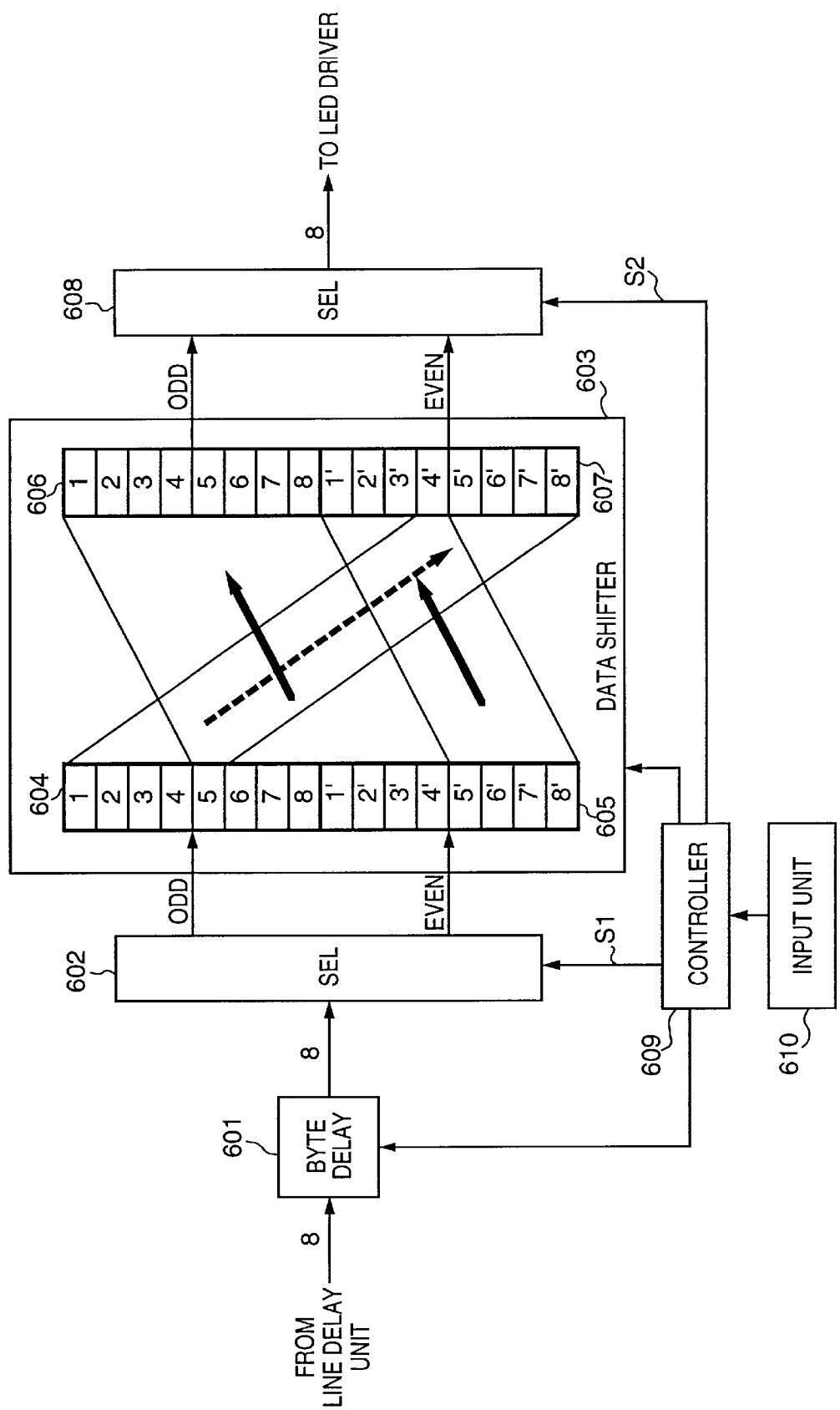
FIG. 6 is a diagram showing another example of the construction of the main-scan correcting unit in FIG. 1.

In this embodiment, the main-scan correction units 214~217 have a construction different from that described above. FIG. 6 illustrates the details of construction of the main-scan correction unit 214 according to this embodiment. As shown in FIG. 6, data sent from the line delay unit 202 first enters a byte delay unit 601 which, in a manner similar to that of the byte delay unit 401 shown in FIG. 4, applies a delay of a number of bytes corresponding to a quotient that is the result of dividing the number of pixels desired to be delayed by eight.

The byte data thus delayed enters a data shifter 603 via a selector 602. The selector 602 distributes its output in conformity with a control signal S1 which indicates whether the input byte data is an odd-numbered byte or an even-numbered byte. More specifically, odd-numbered byte data enters a buffer 604 in the data shifter 603 and even-numbered byte data enters a buffer 605 in the data shifter 603. It should be noted that the buffers 604 and 605 are recognized as being a continuous buffer area.

In a manner similar to that of the bit delay unit 403 shown in FIG. 4, the data shifter 603 subjects two bytes (16 bits) of data held in the buffers 604, 605 to a shift of a number of bits corresponding to the remainder obtained when the number of pixels desired to be delayed is divided by eight. The results of the shift enter shift buffers 606, 607. Then, in dependence upon a control signal S2 which indicates whether byte data to be output is an odd-numbered byte or an even-numbered byte, a selector 608 reads the byte data out of the shift buffer 606 or 607 and outputs the byte data to the LED driver 206.

A case in which four bits are shifted will be described in greater detail by way of example. Assume a situation in which odd-numbered byte data has already been stored in the buffer 604 and even-numbered byte data enters from the buffer 605. In this case, as shown in FIG. 6, eight bits from bit 5 of buffer 604 to bit 4' of buffer 605 enter the shift buffer 606 as a new odd-numbered byte. At the same time, bits from bit 5' to bit 8' of buffer 605 contiguous to this new odd-numbered byte are stored in bit 1' to bit 4' of buffer 607. Furthermore, the first four bits (bit 1 to bit 4) of buffer 604 are stored in the last four bits (bit 5' to bit 8') of buffer 607. When this shift processing ends, the 8-bit data in the shift buffer 606 corresponding to the new odd-numbered byte is read out as odd-numbered byte data in dependence upon the control signal S2.

In a case where odd-numbered byte data has entered the buffer 604, on the other hand, a shift similar to that described above is applied to the 16 bits in the buffers 604, 605, whereby 8-bit data in the shift buffer 607 is read out as a new even-numbered byte.

Thus, byte data held in the shift buffers 606, 607 is read out of the data shifter 603 alternately as odd-numbered and even-numbered bytes, thereby making possible a shift in bit units. In this embodiment also the amount of delay applied by the byte delay unit 601 and the amount of shift applied by the data shifter 603 are decided by a controller 609 in dependence upon an instruction from the input unit 610 in a manner similar to the case shown in FIG. 4. The control signals S1 and S2 are also issued by the controller 609.

In accordance with this embodiment as described above, even an image processing apparatus in which image data is transferred to an LED driver in units of a plurality of pixels (parallel data) can be so adapted that shift buffers are used to shift the parallel data a required number of bits, thereby making it possible to finely adjust the data delay which is based upon pixel units, namely the pixel position in the main-scan direction.

In the embodiments set forth above, the image data is transferred from the reader 1 to the printer 2 upon being packed in 8-bit units, and the image data is then sent to the LED drivers 206~207. However, it goes without saying that the present invention is not limited to 8-bit packs; the packs may be any number of bits so long as a plurality of bits are packed.

Further, 8-bit parallel data is shifted upon being converted to a serial data string. However, this does not impose a limitation upon the invention, for an arrangement may be adopted in which image data that enters N-number of pixels (bits) at a time is output M-number of pixels (bits) at a time, shifted M-number of pixels at a time and output to image forming means, where N is an integer of 2 or greater and N>M holds.

Furthermore, an example has been described in which an LED array is used as means for forming a latent image of a photosensitive drum. However, the present invention is applicable to any image processing apparatus that forms an image by electrophotography. For example, the photosensitive drum may be scanned by a semiconductor laser or by controlling the on/off operation of a liquid crystal shutter.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiments.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 7A:
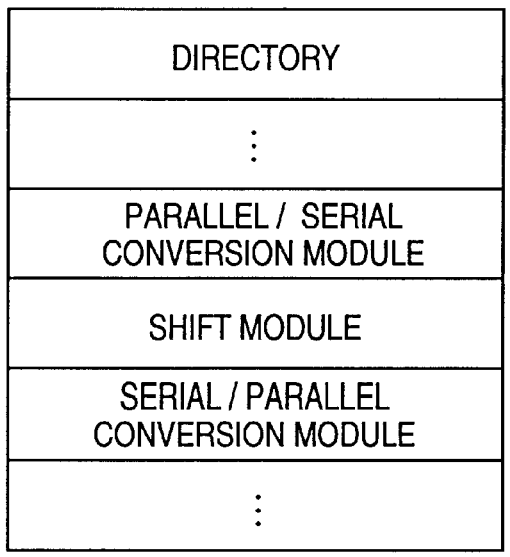
FIGS. 7A to 7B are diagram s showing an example of a memory map when the present invention is applied to a recording medium.
Figure 7B:
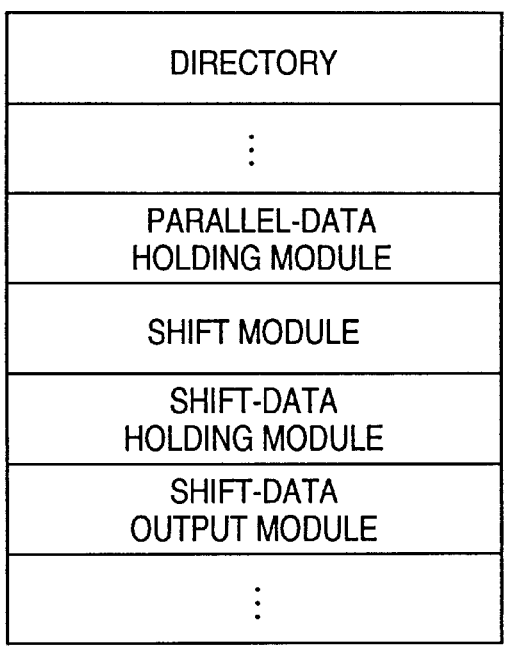

In a case where the present invention is applied to the above-mentioned storage medium, program codes corresponding to the flowcharts described earlier are stored on the storage medium. More specifically, the modules shown in the example of the memory map of FIGS. 7A and 7B are stored on the storage medium. For example, it will suffice to store the program codes of at least the following modules on the storage medium: a "parallel/serial conversion module", a "shift module" and a "serial/parallel conversion module" or a "parallel-data holding module", a "shift module", a "shift-data holding module" and a "shift-data output module".

In the embodiments described above, a positional deviation between images is corrected, where the offset is measured with respect to a predetermined reference position. However, an arrangement may be adopted in which the correction is applied to a positional deviation between images measured with respect to an image of a predetermined color among the four-color images.

Thus, in accordance with the embodiments of the present invention as described above, it is possible to adjust scanning position in the main-scan direction in pixel units in an image processing apparatus of the type in which image data is sent to an image forming section in plural-pixel units and an image is formed by electrophotography.

In particular, it is possible to finely adjust pixel position in the main-scan direction color by color in an image processing apparatus of the type in which full-color image data is sent to an image forming section for each color component in plural-pixel units, an image of each color is formed by electrophotography and the color images are transferred to a single sheet of recording paper. This makes it possible to form a high-quality image that is free of positional deviation.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   first converting means for converting image data, which enters in parallel a plurality of pixels at a time, to a serial image data string;
   shifting means for shifting, by a predetermined number of pixels, the serial image data string output by said first converting means, wherein the predetermined number of pixels equates to an amount of adjustment for correction of an image position;
   second converting means for converting the serial image data string, which has been output by said shifting means, to parallel image data a plurality of pixels at a time; and
   image forming means for forming an image based upon the image data output by said second converting means in parallel a plurality of pixels at a time.

2. The apparatus according to claim 1, wherein said shifting means includes:
   a memory for storing the serial image data string; and
   control means for controlling timing at which the serial image data string is read out of said memory.

3. The apparatus according to claim 2, wherein said shifting means further includes manual input means for entering the amount of adjustment;
   said control means deciding, in accordance with the amount of adjustment, the timing at which the serial image data string is read out of said memory.

4. The apparatus according to claim 1, wherein said shifting means includes:
   first holding means for holding the serial image data string;
   second holding means for holding a serial image data string that has been read out of said first holding means; and
   means for outputting image data, which has been read out of said second holding means, to said second converting means;
   the serial image data string being shifted using said first holding means and said second holding means.

5. The apparatus according to claim 4, wherein said shifting means decides a readout position of the serial image data string in said first holding means in dependence upon amount of shift.

6. The apparatus according to claim 4, wherein said first holding means and said second holding means each hold the serial image data string of a plurality of pixels, and said shifting means shifts the serial image data string in such a manner that all of the image data held in said first holding means will be held by said second holding means.

7. The apparatus according to claim 1, wherein said image forming means has a plurality of image forming units for forming images of colors that differ from one another, and said shifting means shifts the image data of the colors that correspond to the plurality of image forming units.

8. The apparatus according to claim 1, wherein said image forming means forms an image based upon 1-pixel, 1-bit image data.

9. The apparatus according to claim 1, further comprising input means for entering image data selectively from a reading device which reads an image of a subject and outputs image data, and a peripheral device which outputs image data.

10. The apparatus according to claim 1, wherein said image forming means forms an image using electrophotography.

11. A data processing apparatus comprising:
    first converting means for converting digital data, which enters in parallel N-number of bits at a time (where N represents an integer of 2 or greater), to a serial data string;
    shifting means for shifting, by a predetermined number of bits, the serial data string output by said first converting means, wherein the predetermined number of bits equates to an amount of adjustment for correction of a bit position; and
    second converting means for converting the serial data string, which has been output by said shifting means, to parallel data a plurality of bits at a time.

12. The apparatus according to claim 11, further comprising means for supplying image data, which has been output by said second converting means, to output means which outputs information conforming to the input digital data.

13. The apparatus according to claim 11, further comprising second shifting means for shifting digital data, which enters in parallel N-number of bits at a time, N-number of bits at a time and outputting the digital data to said first converting means in parallel N-number of bits at a time.

14. An image forming apparatus comprising:
   first shifting means for shifting input image data in N-pixel units (where N represents an integer of 2 or greater);
   second shifting means for shifting image data, which has been shifted by said first shifting means, in M-pixel units (where M<N holds); and
   image forming means for forming an image based upon image data that has been shifted by said second shifting means,
   wherein numerical values for N and M are determined upon a basis of an amount of adjustment of an image position.

15. The apparatus according to claim 14, wherein the image data enters in N-pixel units and the first shifting means outputs the image data in N-pixel units after shifting the image data in N-pixel units.

16. The apparatus according to claim 15, wherein said second shifting means has converting means for outputting, in M-pixel units, image data output from said first shifting means in N-pixel units.

17. The apparatus according to claim 16, wherein said second shifting means further has output means for outputting image data, which has been shifted in M-pixel units, to said image forming means in N-pixel unit.

18. An image forming method comprising:
   a first converting step of converting image data, which enters in parallel a plurality of pixels at a time, to a serial image data string;
   a shifting step of shifting, by a predetermined number of pixels, the serial image data string output at said first converting step, wherein the predetermined number of pixels equates to an amount of adjustment for correction of an image position;
   a second converting step of converting the serial image data string, which has been output at said shifting step, to parallel image data a plurality of pixels at a time; and
   an image forming step of forming an image based upon the image data output at said second converting step in parallel a plurality of pixels at a time.

19. A data processing method comprising:
   a first converting step of converting digital data, which enters in parallel N-number of bits at a time (where N represents an integer of 2 or greater), to a serial data string;
   a shifting step of shifting, by a predetermined number of bits, the serial data string output at said first converting step, wherein the predetermined number of bits equates to an amount of adjustment for correction of a bit position; and
   a second converting step of converting the serial data string, which has been output at said shifting step, to parallel data a plurality of bits at a time.

20. An image forming method comprising:
   a first shifting step of shifting input image data in N-pixel units (where N represents an integer of 2 or greater);
   a second shifting step of shifting image data, which has been shifted at said first shifting step, in M-pixel units (where M<N holds); and
   an image forming step of forming an image based upon image data that has been shifted at said second shifting step,
   wherein numerical values for N and M are determined upon a basis of an amount of adjustment of an image position.

21. A computer readable storage medium storing program codes for image formation, comprising:
   a program code of a first converting step of converting image data, which enters in parallel a plurality of pixels at a time, to a serial image data string;
   a program code of a shifting step of shifting, by a predetermined number of pixels, the serial image data string output at said first converting step, wherein the predetermined number of pixels equates to an amount of adjustment for correction of an image position;
   a program code of a second converting step of converting the serial image data string, which has been output at said shifting step, to parallel image data a plurality of pixels at a time; and
   a program code of an image forming step of forming an image based upon the image data output at said second converting step in parallel a plurality of pixels at a time.

22. A computer readable storage medium storing program codes for data processing, comprising:
   a program code of a first converting step of converting digital data, which enters in parallel N-number of bits at a time (where N represents an integer of 2 or greater), to a serial data string;
   a program code of a shifting step of shifting, by a predetermined number of bits, the serial data string output at said first converting step, wherein the predetermined number of bits equates to an amount of adjustment for correction of a bit position; and
   a program code of a second converting step of converting the serial data string, which has been output at said shifting step, to parallel data a plurality of bits at a time.

23. A computer readable storage medium storing program codes for image formation, comprising:
   a program code of a first shifting step of shifting input image data in N-pixel units (where N represents an integer of 2 or greater);
   a program code of a second shifting step of shifting image data, which has been shifted at said first shifting step, in M-pixel units (where M<N holds); and
   a program code of an image forming step of forming an image based upon image data that has been shifted at said second shifting step,
   wherein numerical values for N and M are determined upon a basis of an amount of adjustment of an image position.

* * * * *

UNITED STATES PATENT AND TRADEMARK OFFICE
CERTIFICATE OF CORRECTION

PATENT NO.     : 6,295,077 B1
DATED          : September 25, 2001
INVENTOR(S)    : Kazuyoshi Suzuki It is certified that error appears in the above-identified patent and that said Letters Patent is hereby corrected as shown below:

<u>Title page</u>,
Item [56] U.S. PATENT DOCUMENTS,
"3,707,725 12/1972 Dellhelm" should read -- 3,707,725 12/1972 Dellheim --.

<u>Column 2</u>,
Line 25, "construction" should read -- construction of --; and
Line 31, "diagram s" should read -- diagrams --.

<u>Column 5</u>,
Line 34, close up right margin; and
Line 35, close up left margin.

<u>Column 11</u>,
Line 7, "time, N-number of" should read -- time --; and
Line 8, "bits at a time" should be deleted.

Signed and Sealed this

Nineteenth Day of March, 2002

Attest:

Attesting Officer

JAMES E. ROGAN
Director of the United States Patent and Trademark Office